(12) United States Patent
Doser et al.

(10) Patent No.: US 8,270,468 B2
(45) Date of Patent: Sep. 18, 2012

(54) METHOD AND APPARATUS FOR ENCODING AND/OR DECODING VIDEO DATA USING ADAPTIVE PREDICTION ORDER FOR SPATIAL AND BIT DEPTH PREDICTION

(75) Inventors: Ingo Tobias Doser, Villingen-Schwenningen (DE); Yu Wen Wu, Beijing (CN); Yong Ying Gao, Beijing (CN)

(73) Assignee: Thomson Licensing, Boulogne-Billancourt (FR)

( * ) Notice: Subject to any disclaimer, the term of this patent is extended or adjusted under 35 U.S.C. 154(b) by 511 days.

(21) Appl. No.: 12/448,180

(22) PCT Filed: Nov. 27, 2007

(86) PCT No.: PCT/EP2007/062893
§ 371 (c)(1),
(2), (4) Date: Jun. 11, 2009

(87) PCT Pub. No.: WO2008/071542
PCT Pub. Date: Jun. 19, 2008

(65) Prior Publication Data
US 2010/0027619 A1 Feb. 4, 2010

(30) Foreign Application Priority Data
Dec. 14, 2006 (EP) .................... 06301256

(51) Int. Cl.
*H04N 7/12* (2006.01)
*H04N 11/02* (2006.01)
*G06K 9/46* (2006.01)
*G06K 9/68* (2006.01)
*G06K 9/00* (2006.01)

(52) U.S. Cl. ..................... 375/240; 375/240.1; 382/244; 382/218; 382/110

(58) Field of Classification Search .................. 375/240
See application file for complete search history.

(56) References Cited

U.S. PATENT DOCUMENTS 5,973,739 A * 10/1999 Nilsson ...................... 375/240.1
(Continued)

FOREIGN PATENT DOCUMENTS

WO        WO 99/37097        7/1999
(Continued)

OTHER PUBLICATIONS

A. T. Erdem et al: "Compression of 10-bit video using the tools of MEPG-2", Signal Processing, Image Communication, Elsevier Science Publishers, Amsterdam, NL, vol. 7, No. 1, Mar. 1995, pp. 27-56, XP004047120.

(Continued)

*Primary Examiner* — Sath V Perungavoor
*Assistant Examiner* — Xiaolan Xu
(74) *Attorney, Agent, or Firm* — Robert D. Shedd; Jeffrey M. Navon

(57) ABSTRACT

A scalable video bitstream may have an H.264/AVC compatible base layer (BL) and a scalable enhancement layer (EL), where scalability refers to color bit depth. The H.264/AVC scalability extension SVC provides also other types of scalability, e.g. spatial scalability where the number of pixels in BL and EL are different. According to the invention, BL information is upsampled (TUp,BDUp) in two logical steps in adaptive order, one being texture upsampling and the other being bit depth upsampling. Texture upsampling is a process that increases the number of pixels, and bit depth upsampling is a process that increases the number of values that each pixel can have, corresponding to the pixels color intensity. The upsampled BL data are used to predict the collocated EL. A prediction order indication is transferred so that the decoder can upsample BL information in the same manner as the encoder, wherein the upsampling refers to spatial and bit depth characteristics.

10 Claims, 5 Drawing Sheets

U.S. PATENT DOCUMENTS

| | | | |
|---|---|---|---|
| 2002/0131641 A1* | 9/2002 | Luo et al. | 382/218 |
| 2004/0071356 A1* | 4/2004 | Sudharsanan et al. | 382/244 |
| 2004/0091135 A1* | 5/2004 | Bourg et al. | 382/110 |
| 2005/0259729 A1* | 11/2005 | Sun | 375/240.1 |

FOREIGN PATENT DOCUMENTS

| | | |
|---|---|---|
| WO | WO 03/063491 | 7/2003 |

OTHER PUBLICATIONS

R. Schaefer et al: Improving Image Compression-Is It Worth the Effort? Signal Processing: Theories and Applications, Proceedings of EUSIPCO, vol. 2, Sep. 4, 2000, pp. 677-680, XP008007602.

Search Report Dated Feb. 27, 2008.

* cited by examiner

Fig.3 (Intra-encoder)

Fig. 4 (Inter-encoder)

METHOD AND APPARATUS FOR ENCODING AND/OR DECODING VIDEO DATA USING ADAPTIVE PREDICTION ORDER FOR SPATIAL AND BIT DEPTH PREDICTION

This application claims the benefit, under 35 U.S.C. §365 of International Application PCT/EP2007/062893, filed Nov. 27, 2007, which was published in accordance with PCT Article 21(2) on Jun. 19, 2008 in English and which claims the benefit of European patent application No. 06301256.1, filed Dec. 14, 2006.

FIELD OF THE INVENTION

The invention relates to the technical field of digital video coding. It presents a coding solution for a novel type of scalability: bit depth scalability.

BACKGROUND

In recent years, higher color depth rather than the conventional eight bit color depth is more and more desirable in many fields, such as scientific imaging, digital cinema, high-quality-video-enabled computer games and professional studio and home theatre related applications. Accordingly, the state-of-the-art video coding standard H.264/AVC has already included Fidelity Range Extensions (FRExt), which support up to 14 bits per sample and up to 4:4:4 chroma sampling. The current SVC reference software JSVM does not support high bit depth.

However, none of the existing advanced coding solutions supports bit depth scalability. For a scenario with two different decoders, or clients with different requests for the bit depth, e.g. 8 bit and 12 bit for the same raw video, the existing H.264/AVC solution is to encode the 12-bit raw video to generate a first bitstream, and then convert the 12-bit raw video to an 8-bit raw video and encode it to generate a second bitstream. If the video shall be delivered to different clients who request different bit depths, it has to be delivered twice, e.g. the two bitstreams are put in one disk together. This is of low efficiency regarding both the compression ratio and the operational complexity.

The European Patent application EP06291041 discloses a scalable solution to encode the whole 12-bit raw video once to generate one bitstream that contains an H.264/AVC compatible base layer (BL) and a scalable enhancement layer (EL). The overhead of the whole scalable bitstream compared to the above-mentioned first bitstream is small compared to the additional second bitstream. If an H.264/AVC decoder is available at the receiving end, only the BL sub-bitstream is decoded, and the decoded 8-bit video can be viewed on a conventional 8-bit display device; if a bit depth scalable decoder is available at the receiving end, both the BL and the EL sub-bitstreams may be decoded to obtain the 12-bit video, and it can be viewed on a high quality display device that supports color depths of more than eight bit.

SUMMARY OF THE INVENTION

The H.264/AVC scalability extension SVC provides also other types of scalability, e.g. spatial scalability. In spatial scalability the number of pixels in BL and EL are different. Thus, the problem arises how to combine bit depth scalability with other scalability types, and in particular spatial scalability. The present invention provides a solution for this problem.

Claim 1 discloses a method for encoding that allows dynamic adaptive combination of bit depth scalability and other scalability types. Claim 6 discloses a corresponding decoding method.

An apparatus that utilizes the method for encoding is disclosed in claim 9, and an apparatus that utilizes the method for decoding is disclosed in claim 10.

According to one aspect of the invention, BL information is upsampled in two logical steps: one is texture upsampling and the other is bit depth upsampling. Texture upsampling is a process that increases the number of pixels, and bit depth upsampling is a process that increases the number of values that each pixel can have. The value corresponds in principle to the color intensity of the pixel. The upsampled BL unit is used to predict the collocated EL unit.

According to one aspect of the invention, the prediction order is variable: either bit depth upsampling is done before spatial upsampling, or spatial upsampling is done before bit depth upsampling. These are two modes, between which the encoder can dynamically select, depending on the (expected) efficiency with respect to the EL encoding results. According to one aspect of the invention, an encoder includes in the data stream information indicating the selected prediction order, e.g. a prediction order flag. According to one aspect, a decoder detects this information and sets up its prediction order dynamically in response to the information. The decoder should perform the same prediction as the encoder for optimized usage of the residual that it receives.

In one embodiment of the invention, an encoder actually performs the upsampling of BL information in the two possible ways, thus generating two different prediction data sets, then predicts the collocated EL information (e.g. macroblock) and generates two EL residuals. Then it compares these residuals, and decides for the prediction method by which the smaller residual was generated (in terms of data amount).

In one embodiment, the encoder estimates the expected coding result (in terms of data amount of the EL image/residual as described above, compression efficiency of the EL or the like) and switches to the preferred coding mode in response to the expected result, as explained above.

In one embodiment, the encoder analyzes the BL and/or the EL image according to predefined rules, e.g. distribution of colors in a color histogram, texture analysis etc., compares the analysis result with one or more threshold values and according to the comparison result decides which of the two prediction order types to select. The analysis result may be a value indicative of psycho-visual image characteristics, e.g. texture and/or color homogeneity within the analyzed macroblock (MB) or other image unit. Texture upsampling increases the number of pixels, while bit depth upsampling increases the number of values that each pixel can have. If e.g. texture is very smooth and color details are present, then it may be advantageous to perform bit depth upsampling first. On the other hand, if texture is very uneven and color details are difficult to detect for the human eye, then it may be advantageous to perform texture upsampling first.

In one embodiment, an encoder generates from the EL video data a residual based on the prediction data. The residual may be further encoded (usually entropy coded) and transmitted. The BL information to be upsampled can be of any granularity, e.g. units of single pixels, pixel blocks, macroblocks (MBs) or whole images. Further, it may be possible to perform the two logical upsampling steps in the respective order in a single step. The BL information is upsampled at the encoder side, and due to transmission and evaluation of a prediction order flag in the same manner at the decoder side, wherein the upsampling refers to spatial and bit depth characteristics.

Moreover, the combined adaptive spatial and bit depth upsampling can be performed for intra coded as well as for inter coded images.

In particular, a method for encoding video data having a base layer and an enhancement layer, wherein pixels of the base layer have less bit depth and lower spatial resolution than pixels of the enhancement layer, comprises the steps of upsampling base layer information, wherein the upsampling refers to spatial resolution and to bit depth being the possible value range of each pixel, and wherein a predicted version of enhancement layer information is obtained that has higher bit depth and higher spatial resolution than the base layer, generating an enhancement layer residual being the difference between the enhancement layer information and said predicted version of enhancement layer information, and encoding the base layer information, the enhancement layer residual and an indication indicating whether spatial upsampling was done before or after bit depth upsampling.

According to one aspect of the invention, a method for decoding video data comprises the steps of receiving enhancement layer information, base layer information and a prediction order indication, performing inverse quantization and inverse transformation on the received base layer and enhancement layer information, determining a prediction order based upon said prediction order indication, the prediction order indicating whether bit depth upsampling shall be done before or after spatial upsampling, upsampling inverse quantized and inverse transformed base layer information, wherein the number of pixels and the value depth per pixel are increased in the determined prediction order and wherein predicted enhancement layer information is obtained, and reconstructing from the predicted enhancement layer information and the inverse quantized and inverse transformed enhancement layer information reconstructed enhancement layer video information.

In one embodiment of the invention, the method for encoding comprises steps of intra-encoding BL information, reconstructing the intra-encoded BL information, performing spatial upsampling and color bit depth upsampling on the reconstructed BL information, and generating an EL residual being the difference between current EL information (i.e. image data) and said spatially and color bit depth upsampled BL information (i.e. image data).

In one embodiment of the invention, the method for encoding comprises steps of generating a BL residual being the difference between current BL image data and predicted BL image data (as usual for inter-coded BL), wherein the predicted BL image data can be predicted from data of the current or a previous BL image, encoding (i.e. transforming and quantizing) said BL residual, reconstructing (inverse transforming and inverse quantizing) the encoded BL residual, performing residual (spatial) upsampling and color bit depth upsampling on the reconstructed BL residual in the previously determined order and generating an EL inter-layer residual being the difference between current EL residual data and said spatially and color bit depth upsampled reconstructed BL residual.

Advantageously, the two recently mentioned encoder embodiments can be combined into a combined encoder that can adaptively encode intra- and inter-encoded video data.

In one embodiment of the invention, the method for decoding further comprises steps of (implicitly) detecting that the received BL information is intra-coded, reconstructing BL video from the received inverse quantized and inverse transformed BL information, upsampling the reconstructed BL video, wherein the upsampling comprises texture (spatial) upsampling and bit depth upsampling and wherein predicted EL information is obtained, and reconstructing from the predicted EL information and the inverse quantized and inverse transformed received EL information reconstructed EL video information.

In one embodiment of the invention, the method for decoding comprises steps of (implicitly) detecting that received BL data are inter-coded, extracting a BL residual from the received BL data, performing residual (spatial) upsampling and bit depth upsampling on the extracted BL residual, extracting an EL residual from the inverse quantized and inverse transformed EL information, reconstructing from the EL residual and the upsampled BL residual a reconstructed EL residual and reconstructing from the reconstructed EL residual and previously reconstructed EL information reconstructed EL video information.

Advantageously, the two recently mentioned decoder embodiments can be combined into a combined decoder that can adaptively decode intra- and inter-encoded video data.

According to another aspect of the invention, an apparatus for encoding video data having a BL and an EL, wherein the BL has lower color resolution and lower spatial resolution than the EL, comprises means for upsampling BL information, wherein the upsampling refers to spatial resolution and to bit depth being the possible value range of each pixel, and wherein a predicted version of EL information is obtained that has higher bit depth and higher spatial resolution than the BL, means for generating an EL residual being the difference between the EL information and said predicted version of EL information, and means for encoding the BL information, the EL residual and an indication indicating which of the spatial upsampling and the bit depth upsampling was done first. The indication may be encoded e.g. into packet header information. The apparatus may further comprise means for transmitting the encoded BL information, the encoded EL information and said indication, e.g. in a multiplex.

In one embodiment of the invention, an apparatus for encoding or decoding video data comprises means for performing spatial (residual or texture) upsampling and means for performing color bit depth upsampling, wherein the means for spatial upsampling increases the number of values within the input image information and the means for color bit depth upsampling increases the color range of the values (before or after spatial upsampling), and wherein spatially and color bit depth upsampled BL data are obtained.

According to another aspect of the invention, an encoded scalable video signal comprises encoded BL data, encoded EL data and a prediction order indication, wherein the encoded EL data comprises a residual being the difference between a spatially and bit depth upsampled BL image and an EL image, wherein the residual comprises differential texture information and differential bit depth information and wherein the prediction order indication indicates which of the two upsampling steps was done first for obtaining said spatially and bit depth upsampled BL image, or in other words which of the two upsampling steps has to be done first in a decoder for re-obtaining said spatially and bit depth upsampled BL image to which said EL residual refers.

Various embodiments of the presented coding solution are compatible to H.264/AVC and all kinds of scalability that are currently defined in H.264/AVC scalable extension (SVC).

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 a framework of color bit depth scalable coding.

DETAILED DESCRIPTION OF THE INVENTION

Figure 1:
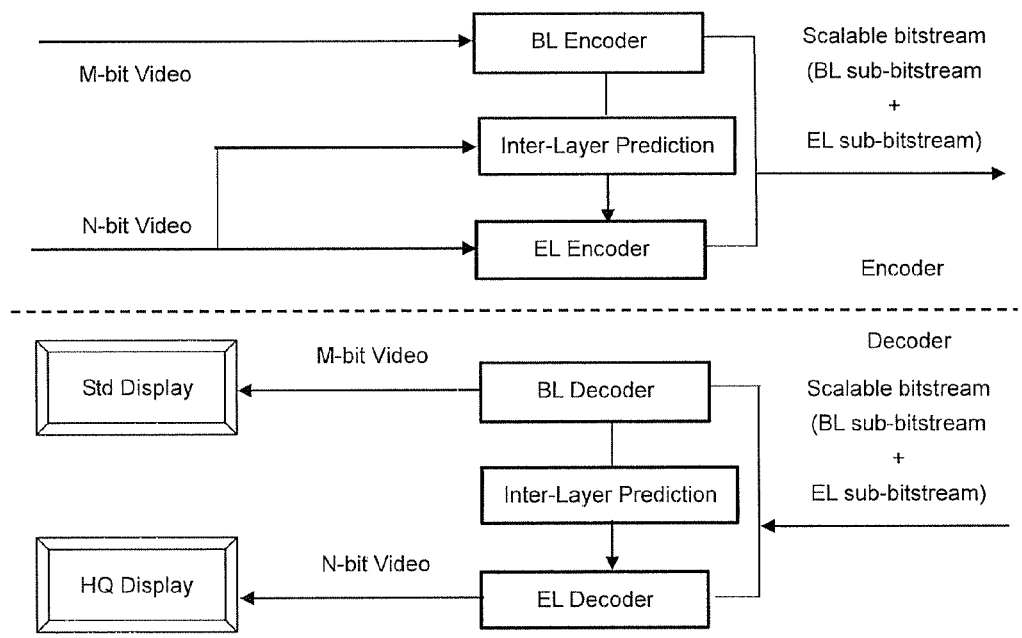

As shown in FIG. 1, two videos are used as input to the video encoder: N-bit raw video and M-bit (M<N, usually M=8) video. The M-bit video can be either decomposed from the N-bit raw video or given by other ways. The scalable solution can reduce the redundancy between two layers by using pictures of the BL. The two video streams, one with 8-bit color and the other with N-bit color (N>8), are input to the encoder, and the output is a scalable bit-stream. It is also possible that only one N-bit color data stream is input, from which an M-bit (M<N) color data stream is internally generated for the BL. The M-bit video is encoded as the BL using the included H.264/AVC encoder. The information of the BL can be used to improve the coding efficiency of the EL. This is called inter-layer prediction herein. Each picture—a group of MBs—has two access units, one for the BL and the other one for the EL. The coded bitstreams are multiplexed to form a scalable bitstream. The BL encoder comprises e.g. an H.264/AVC encoder, and the reconstruction is used to predict the N-bit color video, which will be used for the EL encoding.

As shown in FIG. 1, the scalable bit-stream exemplarily contains an AVC compliant BL bit-stream, which can be decoded by a BL decoder (conventional AVC decoder). Then the same prediction as in the encoder will be done at the decoder side (after evaluation of a respective indication) to get the predicted N-bit video. With the N-bit predicted video, the EL decoder will then use the N-bit prediction to generate the final N-bit video for a High Quality display HQ.

The present invention provides a technical solution for adaptive inter-layer prediction order of spatial and color bit depth scalability. If two (e.g. adjacent) layers have different spatial resolution and bit depth, two kinds of inter-layer prediction are needed for encoding and decoding more effectively, namely spatial inter-layer prediction and color bit depth inter-layer prediction. Which kind of inter-layer prediction should be done first is variable, and according to the invention can be dynamically selected.

When the term color bit depth is used herein it means bit depth, i.e. the number of bits per value. This is usually corresponding to color intensity.

Exemplarily, when two adjacent layers have different spatial resolution and different bit depths, the order of two kinds of inter-layer prediction can be decided by a flag, e.g. a bit_depth_pred_after_spatial flag. When this flag is equal to 1, the decoder can determine that the spatial inter-layer prediction should be done before the bit depth prediction. Otherwise the bit depth inter-layer prediction must be done first. In another embodiment, a default order is predefined for encoder and decoder, and an encoder inserts an indication flag only when it changes the default order, while a decoder changes the default order only when it detects such indication flag in the received data stream.

In one embodiment, the present invention is based on the current structure of SVC spatial, temporal and quality scalability, and is enhanced by bit depth scalability for enhanced color bit depth. Hence, this embodiment is completely compatible to current SVC standard. However, it will be easy for the skilled person to adapt it to other standards. The key of bit depth scalability is the bit depth inter-layer prediction. By using the inter-layer prediction, the difference between the N-bit and M-bit video is encoded as the EL.

In the following, an exemplary embodiment based on the SVC standard is described.

A new syntax element bit_depth_pred_after_spatial_flag is introduced in order to support changing the order of two kinds of inter-layer prediction. The new syntax element can be added to the sequence parameter set (SPS) SVC extension (seq_parameter_set_svc_extension( )), as done in Tab.1 in lines 12-14, or it can be added to the slice header in scalable extension (slice_header_in_scalable_extension( )), as in Tab.2 in lines 39-41.

TABLE 1

New syntax element added to the SPS SVC extension

| seq_parameter_set_svc_extension( ) { | C | Descr | # |
|---|---|---|---|
|   extended_spatial_scalability | 0 | u(2) | 1 |
|   if ( chroma_format_idc > 0 ) { | | | 2 |
|     chroma_phase_x_plus1 | 0 | u(2) | 3 |
|     chroma_phase_y_plus1 | 0 | u(2) | 4 |
|   } | | | 5 |
|   if( extended_spatial_scalability = = 1 ) { | | | 6 |
|     scaled_base_left_offset | 0 | se(v) | 7 |
|     scaled_base_top_offset | 0 | se(v) | 8 |
|     scaled_base_right_offset | 0 | se(v) | 9 |
|     scaled_base_bottom_offset | 0 | se(v) | 10 |
|   } | | | 11 |
|   if( isBitDepthInterLayerPred( ) ) { | | | 12 |
|     bit_depth_pred_after_spatial_flag | 0 | u(1) | 13 |
|   } | | | 14 |
|   fgs_coding_mode | 2 | u(1) | 15 |
|   if( fgs_coding_mode = = 0 ) { | | | 16 |
|     groupingSizeMinus1 | 2 | ue(v) | 17 |
|   } else { | | | 18 |

TABLE 1-continued

New syntax element added to the SPS SVC extension

| seq_parameter_set_svc_extension( ) { | C | Descr | # |
|---|---|---|---|
|     numPosVector = 0 | | | 19 |
|     do { | | | 20 |
|         if( numPosVector = = 0 ) { | | | 21 |
|             scanIndex0 | 2 | ue(v) | 22 |
|         } | | | 23 |
|         else { | | | 24 |
|             deltaScanIndexMinus1[numPosVector] | 2 | ue(v) | 25 |
|         } | | | 26 |
|         numPosVector ++ | | | 27 |
|     } while(scanPosVectLuma[numPosVector − 1]<15) | | | 28 |
|     } | | | 29 |
| } | | | 30 |

TABLE 2

New syntax element added to the slice header in scalable extension

| slice_header_in_scalable_extension ( ) { | C | Descr | # |
|---|---|---|---|
|     first_mb_in_slice | 2 | ue(v) | 1 |
|     slice_type | 2 | ue(v) | 2 |
|     pic_parameter_set_id | 2 | ue(v) | 3 |
|     frame_num | 2 | u(v) | 4 |
|     if( !frame_mbs_only_flag ) { | | | 5 |
|         field_pic_flag | 2 | u(1) | 6 |
|         if( field_pic_flag ) | | | 7 |
|             bottom_field_flag | 2 | u(1) | 8 |
|     } | | | 9 |
|     if( nal_unit_type == 21 ) | | | 10 |
|         idr_pic_id | 2 | ue(v) | 11 |
|     if( pic_order_cnt_type == 0 ) { | | | 12 |
|         pic_order_cnt_lsb | 2 | u(v) | 13 |
|         if( pic_order_present_flag && !field_pic_flag ) | | | 14 |
|             delta_pic_order_cnt_bottom | 2 | se(v) | 15 |
|     } | | | 16 |
|     if( pic_order_cnt_type == 1 && !delta_pic_order_always_zero_flag ) { | | | 17 |
|         delta_pic_order_cnt[ 0 ] | 2 | se(v) | 18 |
|         if( pic_order_present_flag && !field_pic_flag ) | | | 19 |
|             delta_pic_order_cnt[ 1 ] | 2 | se(v) | 20 |
|     } | | | 21 |
|     if( redundant_pic_cnt_present_flag ) | | | 22 |
|         redundant_pic_cnt | 2 | ue(v) | 23 |
|     if( slice_type == EB ) | | | 24 |
|         direct_spatial_mv_pred_flag | 2 | u(1) | 25 |
|     if( slice_type != PR ) { | | | 26 |
|         if( slice_type == EP || slice_type == EB ) { | | | 27 |
|             num_ref_idx_active_override_flag | 2 | u(1) | 28 |
|             if( num_ref_idx_active_override_flag ) { | | | 29 |
|                 num_ref_idx_l0_active_minus1 | 2 | ue(v) | 30 |
|                 if( slice_type = = EB ) | | | 31 |
|                     num_ref_idx_l1_active_minus1 | 2 | ue(v) | 32 |
|             } | | | 33 |
|         } | | | 34 |
|         ref_pic_list_reordering ( ) | 2 | | 35 |
|         if ( !layer_base_flag ) { | | | 36 |
|             base_id | 2 | ue(v) | 37 |
|             adaptive_prediction_flag | 2 | u(1) | 38 |
|             if( isBitDepthInterLayerPred( ) ) { | | | 39 |
|                 bit_depth_pred_after_spatial_flag | 0 | u(1) | 40 |
|             } | | | 41 |
|         } | | | 42 |
|     . . . | | | 43 |

Exemplarily, bit_depth_pred_after_spatial_flag equal to 1 specifies that bit depth inter-layer prediction shall be done after spatial inter-layer prediction. Its value being equal to 0 specifies that bit depth inter-layer prediction shall be done before spatial inter-layer prediction. In this example, bit depth inter-layer prediction shall be preferably done after spatial inter-layer prediction, so that the default value is 1.

isBitDepthInterLayerPred( ) is a flag that returns whether bit depth inter-layer prediction is needed or not.

Figure 2:
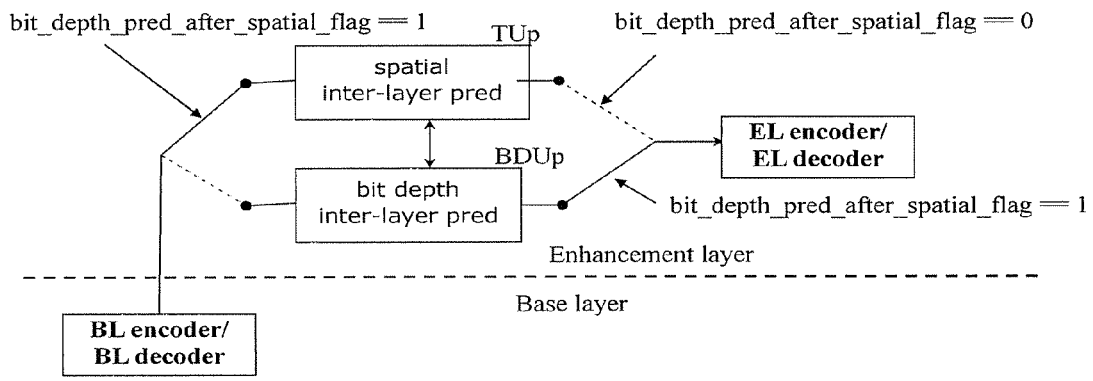
FIG. 2 the structure of adaptive prediction order in an encoder and/or a decoder.

For the convenience of statements, the following denotations will be used in the following:

$BL_{org}$: base layer original MB
$BL_{res}$: base layer residual MB
$BL_{rec}$: base layer reconstructed MB
$EL_{org}$: enhancement layer original MB
$EL_{rec}$: enhancement layer reconstructed MB
$EL'_{res}$: enhancement layer residual MB
$Pre_c\{\ \}$: color bit depth inter-layer prediction operator
$Pre_t\{\ \}$: texture (spatial) inter-layer prediction operator
$Pre_r\{\ \}$: residual (spatial) inter-layer prediction operator FIG. 2 shows the general concept of adaptive prediction order: in the case of an encoder, the EL is predicted based on an upsampled version of the BL. The upsampling comprises spatial upsampling TUp and bit depth upsampling BDUp, wherein the upsampling order is variable. Either the spatial upsampling step or the bit depth upsampling step is done first, and the respective other step is performed on the output of the selected first upsampling step. For this purpose, a flag bit_depth_after_spatial_flag is generated by the encoder, transmitted and then evaluated by the decoder. Thus, both can perform the two upsampling steps in the same order and obtain identical prediction data. Therefore the decoder can apply the EL residual on the same prediction that the encoder had used for generating the residual, which enhances the quality of the reconstructed EL image.

Exemplarily, the MB level bit depth scalable coding solution is based on the current SVC spatial scalability. The following provides a detailed description of the extension of the spatial scalability to bit depth scalability for both intra coding and inter coding. The first step of SVC compatible bit depth scalable coding is to support high bit coding as what the H.264/AVC FRExt extension does (currently 10 to 14 bits per sample) in the EL encoding and decoding.

Intra Coding

Figure 3:
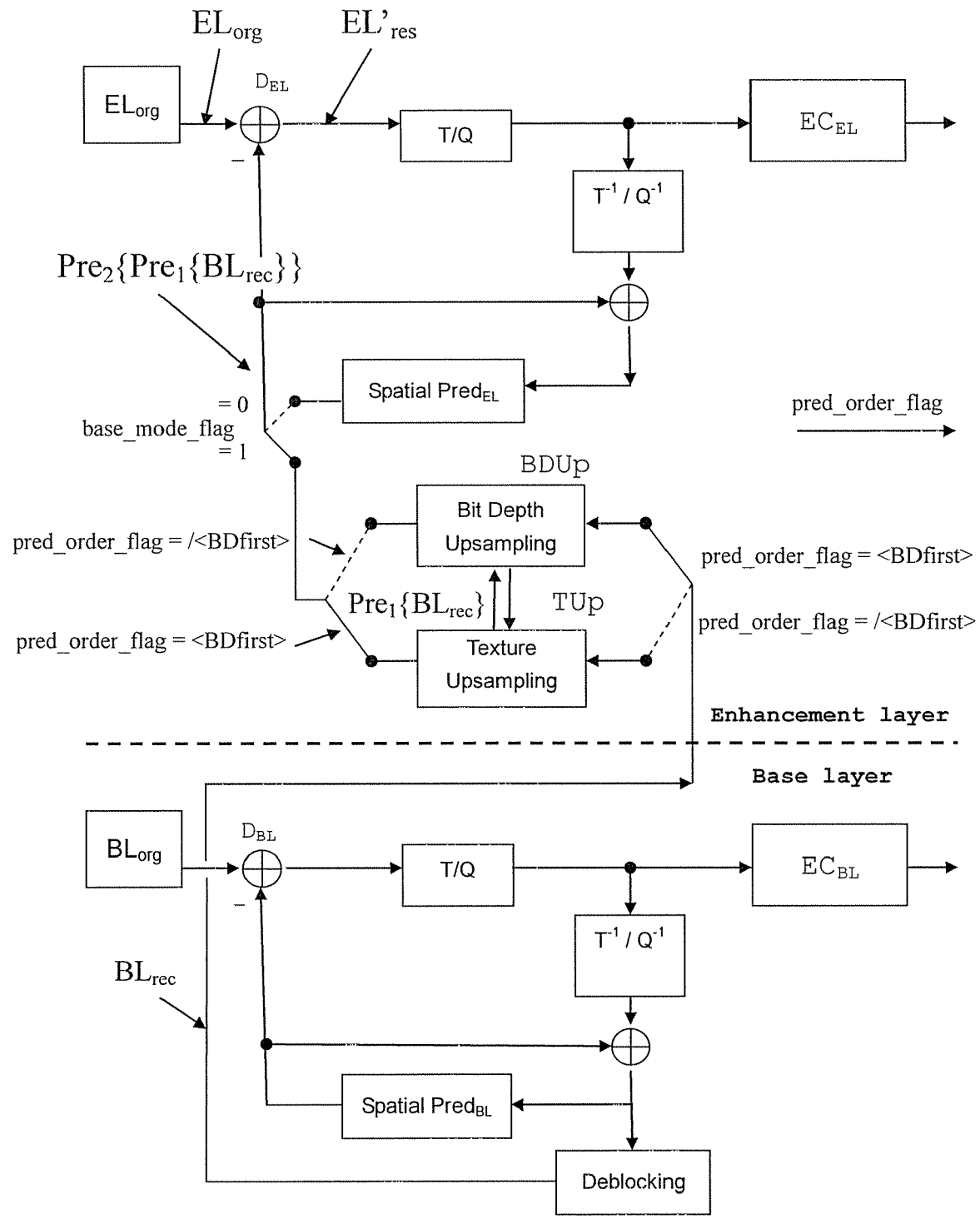
FIG. 3 an encoder for intra coded video with inter-layer prediction extended from spatial scalability to color bit depth scalability with adaptive prediction order.

FIG. 3 shows an encoder for the extension of intra texture inter-layer prediction of spatial scalability, as used in the current SVC standard, to bit depth scalability. In FIG. 3, M-bit base layer MBs are input to the BL encoder, and N-bit enhancement layer MBs are input to the EL encoder (N>M). The bit depth upsampling block BDUp represents the extension to bit depth scalability, while the other blocks represent the spatial scalability in the current SVC standard.

There are two blocks for upsampling, which are passed sequentially by the BL information. The sequence is given by a prediction order flag pred_order_flag, which in a principle model of FIG. 3 controls two synchronized switches. Therefore, the BL information may first be spatially upsampled TUp and then bit depth upsampled BDUp, or vice versa, depending on the prediction order flag. In an encoder, this flag is e.g. the output of a prediction order determination unit, while in a decoder it is extracted from the bit stream. Thus, the signal $Pre_1\{BL_{rec}\}$ that is passed between the two upsampling blocks is either the spatially upsampled BL data to be bit depth upsampled, or the bit depth upsampled BL data to be spatially upsampled. Correspondingly, the final prediction data $Pre_2\{Pre_1\{BL_{rec}\}\}$, e.g. predicted version of the N-bit EL macroblock, is either bit depth-then-spatially upsampled BL data, or spatially-then-bit depth upsampled BL data. These two predictions differ slightly, depending on the image contents. Therefore one of them will match the actual EL image better, and will be selected (not shown in FIG. 3) for prediction because it produces a smaller EL residual. In FIG. 3 the input to the first upsampling block is the reconstructed BL macroblock $BL_{rec}$ other than a BL residual, as in current SVC. This has been found to be advantageous for usage with bit depth upsampling.

In one embodiment, the encoder has means for determining which of the two prediction order types produces a better matching prediction, and means for selecting this prediction order type.

The residual $EL'_{res}$ between the original N-bit EL macroblock $EL_{org}$ and its predicted version $Pre_2\{Pre_1\{BL_{rec}\}\}$ is obtained by a difference generator $D_{EL}$. The residual is in this example further transformed T, quantized Q and entropy encoded $EC_{EL}$ to form the EL sub-bitstream, like in SVC. In a mathematical expression, the residual of color bit depth intra upsampling is $$EL'_{res} = EL_{org} - Pre_c\{Pre_t\{BL_{rec}\}\} \qquad (\text{Eq. 1})$$

where $Pre_1\{\ \}$ and $Pre_2\{\ \}$ represent the texture upsampling operator and bit depth upsampling operator.

Further variations of the encoding process are possible and can be controlled by other control parameters. An exemplary flag base_mode_flag is shown in FIG. 3 that decides whether EL residuals are predicted based on reconstructed EL information or based on upsampled BL information. Again, in an encoder this flag may be generated by an encoding mode selection unit, e.g. based on rate-distortion optimization (RDO).

Inter Coding

Bit depth scalability for inter-coding is implemented different from that for intra-coding. In the current SVC standard, motion upsampling and residual upsampling were designed for spatial inter texture inter-layer prediction. However, adaptive prediction order uses the same principle as for intra coding, except that spatial upsampling is based on residual instead of texture.

Figure 4:
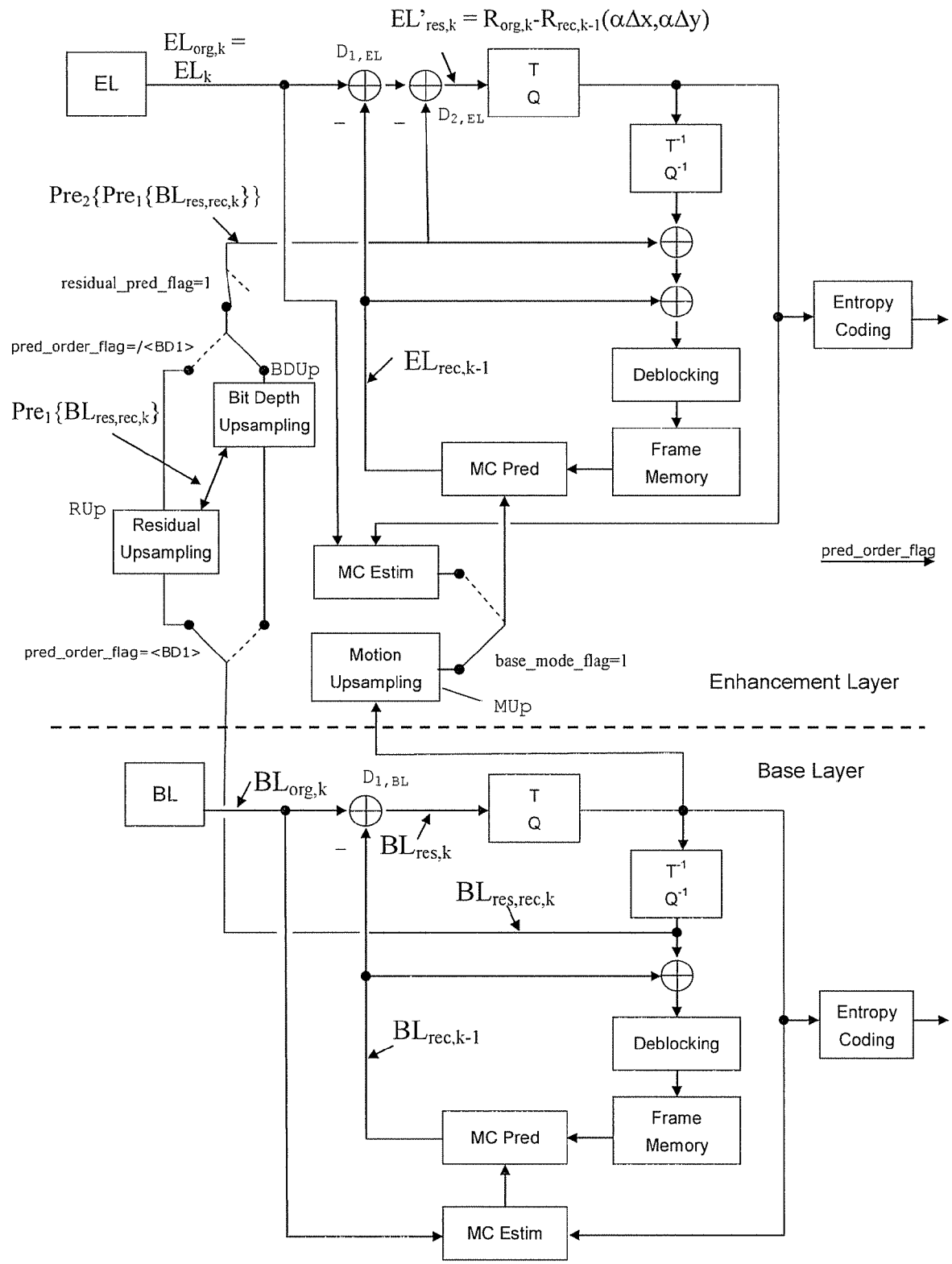
FIG. 4 an encoder for inter coded video with inter-layer prediction extended from spatial scalability to color bit depth scalability with adaptive prediction order.

FIG. 4 shows an encoder for the extension of residual inter-layer prediction for inter-coded (P and B) MBs. Prediction of EL information is realized by the steps of bit depth upsampling BDUp and (spatial) residual upsampling RUp. The input to the first upsampling block is the reconstructed BL residual $BL_{res,rec,k}$ which is a reconstructed version of the to-be-transmitted BL residual $BL_{res,k}$ (as expressed in Eq. (3) below). In practice, motion upsampling MUp is often done first, and then the residual upsampling RUp as a kind of spatial inter-layer prediction and the bit depth upsampling BDUp as bit depth inter-layer prediction are done in an optimized order. With the motion upsampling MUp, residual upsampling RUp and the color bit depth upsampling BDUp, a predicted version $Pre_2\{Pre_1\{BL_{res,rec,k}\}\}$ of the N-bit EL macroblock is obtained. The resulting EL residual $EL'_{res,k}$ (as defined in (Eq. 3) below) is further transformed T, quantized Q and entropy encoded to form the EL sub-bitstream, like in SVC.

Further variations of the encoding process are possible and can be controlled by other control parameters. Flags shown in FIG. 4, on top of a prediction order flag pred_order_flag, are base_mode_flag, which controls whether EL motion compensation is based on motion vectors obtained from the EL or upsampled from the BL, and residual_pred_flag, which controls whether the BL residual is used to predict the EL residual. As shown in FIG. 4, the base_mode_flag is also used for controlling intra texture inter-layer prediction.

Figure 6:
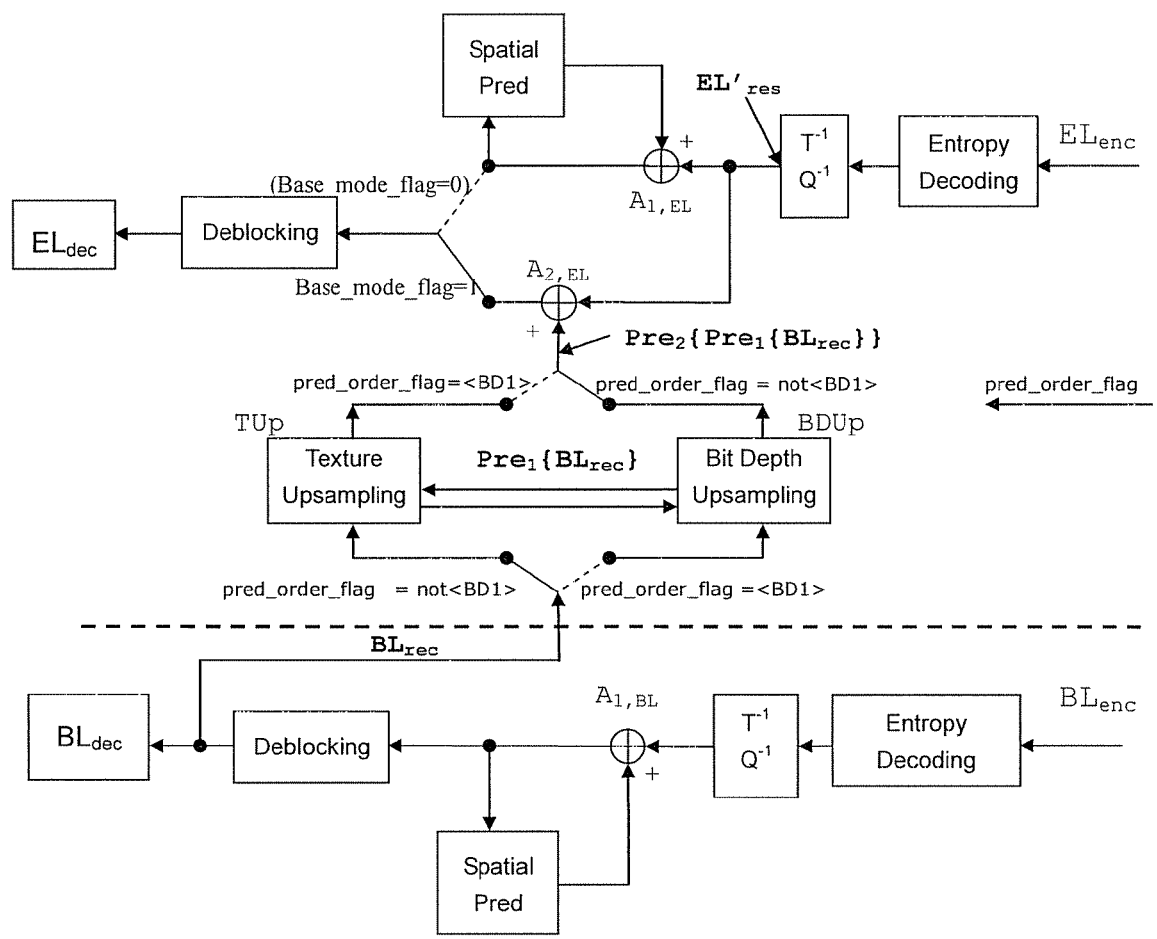
FIG. 6 a decoder for intra coded video with inter-layer prediction extended from spatial scalability to color bit depth scalability with adaptive prediction order.

FIG. 6 shows an exemplary decoder for intra coded BL images that utilizes adaptive inter-layer prediction. After receiving encoded BL data, EL data and prediction order information, e.g. in a multiplexed packetized bitstream, and separating BL from EL data, the BL data as well as EL data are entropy decoded. Then inverse quantization $Q^{-1}$ and inverse transformation $T^{-1}$ are applied. For the BL, the processing is the same as for conventional SVC: the images are reconstructed using spatial intra prediction, i.e. based on previously reconstructed information of the same image. After deblocking, the resulting BL signal $BL_{rec}$ can be displayed on a standard SVC display with 8 bit color depth, as described above. Alternatively however this signal can also be used to generate a predicted version of the collocated EL image. For this purpose a texture and bit depth upsampled reconstructed BL image $Pre_2\{Pre_1\{BL_{rec}\}\}$ is generated, wherein the prediction order is adaptively set according to the received prediction order information pred_order_flag. This information may be valid e.g. for a slice, a GOP (group-of-pictures) or single images.

In one mode the reconstructed BL is first texture upsampled TUp, wherein a texture predicted version of the EL image $Pre_t\{BL_{rec}\}=Pre_1\{BL_{rec}\}$ is obtained. This is then bit depth upsampled BDUp, resulting in a texture-then-bit depth upsampled BL image $Pre_c\{Pre_t\{BL_{rec}\}\}=Pre_2\{Pre_1\{BL_{rec}\}\}$.

In another mode the reconstructed BL is first bit depth upsampled BDUp, wherein a bit depth predicted version of the EL image $Pre_c\{BL_{rec}\}=Pre_1\{BL_{rec}\}$ is obtained, which is then texture upsampled TUp, resulting in a bit depth-then-texture upsampled BL image $Pre_t\{Pre_c\{BL_{rec}\}\}=Pre_2\{Pre_1\{BL_{rec}\}\}$.

The texture and bit depth upsampled reconstructed BL image $Pre_2\{Pre_1\{BL_{rec}\}\}$ is then used to update $A_{2,EL}$ the improved, inverse quantized and inverse transformed EL residual $EL'_{res}$, thereby obtaining a signal that after deblocking can be output as EL video $EL_{rec}$ for HQ displays.

In the described example, a decoder that is operated in EL mode generates internally also the BL video $BL_{rec}$, since it is required for EL prediction, but the BL video needs not necessarily be available at the decoder output. In one embodiment the decoder has two outputs, one for BL video $BL_{rec}$ and one for EL video $EL_{rec}$, while in another embodiment it has only an output for EL video $EL_{rec}$.

As described above for the intra encoder of FIG. 3, also the decoder can work in further modes corresponding to the encoder. Thus further respective flags may be extracted from the bitstream and evaluated, e.g. an indication base_mode_flag that decides whether or not inter-layer prediction is used at all. If not (base_mode_flag=0), EL images are conventionally reconstructed using deblocking, spatial prediction and update $A_{1,EL}$ of the spatially predicted image.

Figure 5:
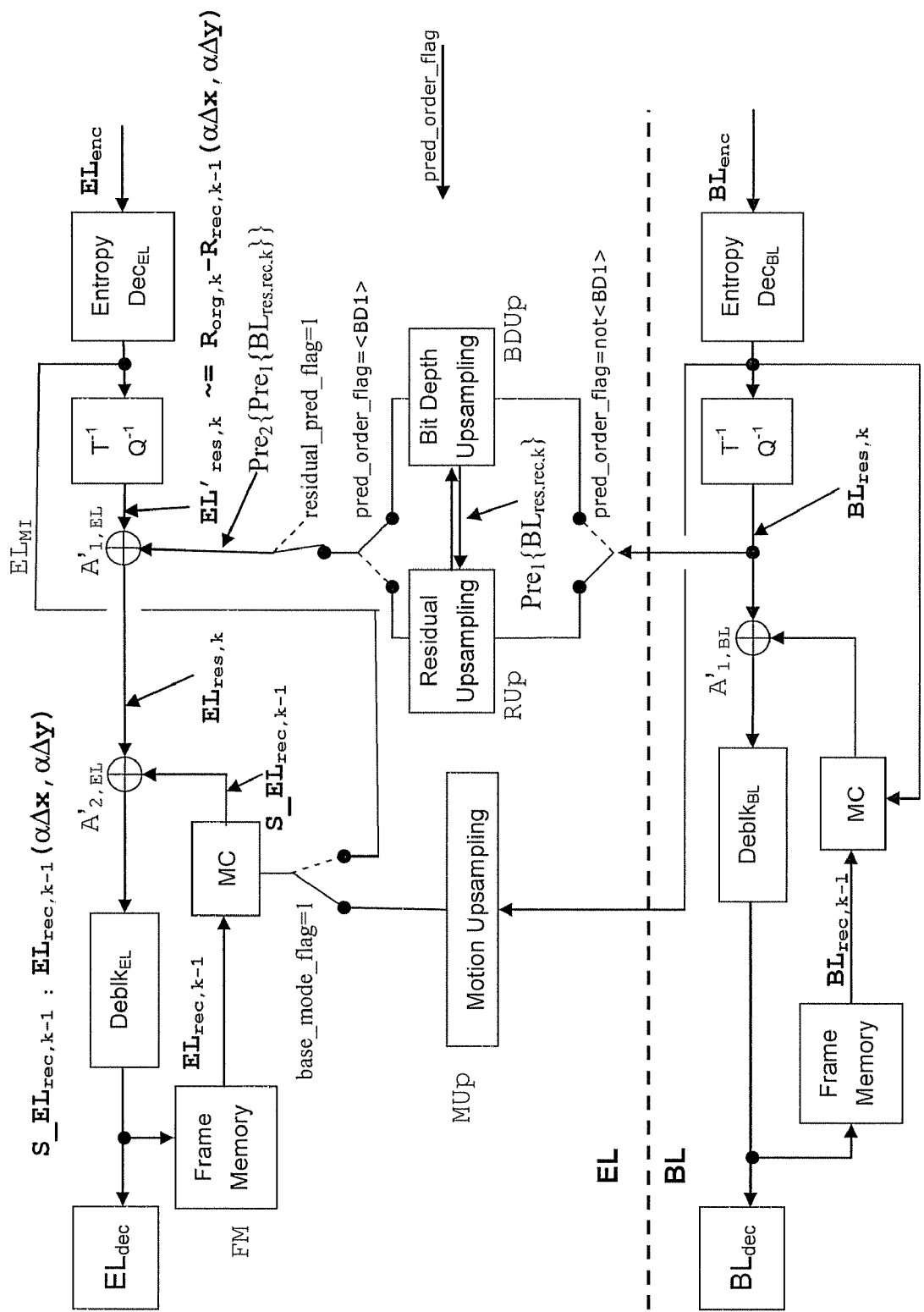
FIG. 5 a decoder for inter coded video with inter-layer prediction extended from spatial scalability to color bit depth scalability with adaptive prediction order.

FIG. 5 shows an exemplary decoder for inter-coded units, e.g. inter-coded MBs. From a BL bitstream, which may have been entropy coded and correspondingly decoded, prediction order information and in one embodiment also motion data are detected and extracted. The motion data can be upsampled for the EL if required. This can be indicated by an indication that is included in the BL or EL bitstream. The BL bitstream data are inverse quantized $Q^{-1}$ and inverse transformed $T^{-1}$, whereby a reconstructed BL residual $BL_{res,k}$ is obtained. If a BL video signal $BL_{dec}$ is required, further BL processing includes conventional SVC decoding including deblocking, storage in a frame memory, motion compensation and updating the motion compensated prediction image with the residual $BL_{res,k}$. If only an EL video signal is required, these steps can be omitted.

The residual $BL_{res,k}$ is used for predicting EL data: it is upsampled by residual upsampling RUp and bit depth upsampling according to the received prediction order information pred_order_flag to produce a predicted signal $Pre_2\{Pre_1\{BL_{res,k}\}\}$. Residual upsampling RUp is a kind of spatial upsampling, i.e. the number of values is increased, and bit depth upsampling BDUp means that the bit depth and thus the possible range of each value is increased. If the collocated EL unit has been encoded using residual inter-layer prediction, as indicated by a flag residual_pred_flag, the predicted residual $Pre_2\{Pre_1\{BL_{rec}\}\}$ is used to update $A'_1$ the received, inverse quantized and inverse transformed EL residual $EL'_{res,k}$, whereby the actual EL residual $EL_{res,k}$ is obtained. The received, inverse quantized and inverse transformed EL residual $EL'_{res,k}$ is in principle equivalent to the difference between the conventional spatial EL residual $R_{org}$ and a residual $R_{rec,k-1}(\alpha\Delta x, \alpha\Delta y)$ that was reconstructed in the encoder from a previous unit k−1 and then upsampled.

The further EL processing is in principle like in SVC (however using enhanced bit depth): the reconstructed residual $EL_{res,k}$ is used to update a predicted EL image $S\_EL_{rec,k-1}=EL_{rec,k-1}(\alpha\Delta x, \alpha\Delta y)$ with steps of deblocking $Deblk_{EL}$, storage in a frame memory FM and motion compensation MC of the reconstructed image $EL_{rec,k-1}$. If the received enhancement layer data $EL_{enc}$ contains motion information $EL_{MI}$, the motion information is extracted and can be provided to the motion compensation unit MC. Alternatively the upsampled MUp motion information from the BL can be used.

Apparently the improved EL residual according to the invention is different from that defined in SVC spatial scalability. However, its encoding is in principle equivalent to inter encoding the difference between the original EL macroblock $EL_{org,k}$ and the texture (spatially) and bit depth upsampled BL macroblock $Pre_2\{Pre_1\{BL_{org,k}\}\}$, as shown below for the case of spatial upsampling being done before bit depth upsampling. The proceeding is equivalent for the other case.

Assume that both the residual upsampling operator $Pre_r\{\}$ and the color bit depth inter-layer prediction operator $Pre_c\{\}$ have the attribute of additivity and stability. In practice the residual upsampling operation that is employed in current SVC spatial scalability is of additivity and stability[1]. In the following it is proved that encoding of the redefined EL residual $EL'_{res,k}$ is equivalent to inter encoding of the difference between the original EL MB and the reconstructed EL macroblock (motion upsampled, residual upsampled and then color bit depth upsampled version of the collocated BL macroblock). The difference between the EL macroblock and the residual upsampled and then bit depth upsampled version of the collocated BL macroblock) is defined as follows:

$$R_k = EL_k - Pre_c\{Pre_r\{BL_k\}\}, \tag{Eq. 2}$$

where k represents the POC (picture order count) of the current frame.

[1] In the case of continuous functions, "stability" is equivalent to derivativeness; in the case of discrete functions, "stability" means that at any available values of the independent variable, the absolute value of the change of the discrete function is no greater than the absolute value of the change of the independent variable multiplied by a constant.

Without loss of generality, we assume that the following two conditions are satisfied: first, the current MB has only one reference MB, with the POC of the current MB frame equals k and the POC of the reference MB frame equals (k−1); second, there are only two spatial layers. Based on the two assumptions, the proof for Eq. (2) is as follows.

$$EL'_{res,k} = EL_{org,k} - EL_{rec,k-1}(\alpha\Delta x, \alpha\Delta y) - \qquad \text{(Eq. 3)}$$
$$Pre_c\{Pre_r\{BL_{res,k}\}\}$$
$$= EL_{org,k} - EL_{rec,k-1}(\alpha\Delta x, \alpha\Delta y) -$$
$$Pre_c\{Pre_r\{BL_{org,k} - BL_{rec,k-1}(\Delta x, \Delta y)\}\}$$

where $(\Delta x, \Delta y)$ represents the motion vector of the current k-th BL macroblock, $\alpha$ represents the spatial resolution scaling factor of the EL, $BL_{rec,k-1}(\Delta x,\Delta y)$ represents the motion compensated version of the reconstructed (k−1)-th BL macroblock, and $EL_{rec,k-1}(\alpha\Delta x,\alpha\Delta y)$ represents the motion (upsampled motion) compensated version of the reconstructed (k−1)-th EL macroblock. According to the assumption that both $Pre_r\{\ \}$ and $Pre_c\{\ \}$ have the attribute of additivity, Eq. (3) is equivalent to:

$$EL'_{res,k} = EL_{org,k} - EL_{rec,k-1}(\alpha\Delta x, \alpha\Delta y) - \qquad \text{(Eq. 4)}$$
$$Pre_c\{Pre_r\{BL_{org,k}\}\} +$$
$$Pre_c\{Pre_r\{BL_{rec,k-1}(\Delta x, \Delta y)\}\}$$
$$= (EL_{org,k} - Pre_c\{Pre_r\{BL_{org,k}\}\}) -$$
$$(EL_{rec,k-1}(\alpha\Delta x, \alpha\Delta y) - Pre_c\{Pre_r\{BL_{rec,k-1}(\Delta x, \Delta y)\}\})$$

According to the assumption that both $Pre_r\{\ \}$ and $Pre_c\{\ \}$ have the attribute of stability, substitute Eq. (2) into Eq. (4):

$$EL'_{res,k} \cong R_{org,k} - R_{rec,k-1}(\alpha\Delta x, \alpha\Delta y) \qquad \text{(Eq. 5)}$$

Eq. (5) shows that the redefined EL residual $EL'_{res,k}$ is equivalent to the difference between the inter-layer residual $R_{org,k}$ of the original BL macroblock $BL_{org,k}$ and the original EL macroblock $EL_{org,k}$ and the inter-layer residual $R_{rec,k-1}$ of the motion compensated reconstructed reference BL macroblock $BL_{rec,k-1}$ and the motion (upsampled motion) compensated reconstructed reference EL macroblock $EL_{rec,k-1}$. In other words, the inter-layer residual is inter-coded. However, the encoding shown in FIG. 5 is advantageous since it is simpler.

One advantage, particularly for inter coding, is that a high coding efficiency is obtained because the finally encoded EL residual is "the residual of the residual", and therefore equivalent to inter encoding of the inter-layer residual as defined in (Eq. 3). In practice, the final coded EL residual in inter coding is equivalent to the original EL macroblock minus the motion (upsampled motion) compensated reconstructed reference EL macroblock and then minus the motion compensated, residual upsampled and then bit depth upsampled version of the collocated BL reconstructed residual.

A further advantage is that for the case of inter coding there is no need to reconstruct the BL macroblocks. Thus, BL reconstruction can be skipped, which makes the decoder simpler.

Advantageously, the intra coding of the color bit depth scalability is realized by the presented intra color bit depth inter-layer prediction and intra texture inter-layer prediction in adaptive order. Described embodiments are compatible with existing SVC prediction modes.

Thus, the invention can be used for scalable encoders, scalable decoders and scalable signals, particularly for video signals or other types of signals that have different quality layers and high inter-layer redundancy.

It will be understood that the present invention has been described purely by way of example, and modifications of detail can be made without departing from the scope of the invention. Each feature disclosed in the description and (where appropriate) the claims and drawings may be provided independently or in any appropriate combination. Features may (where appropriate) be implemented in hardware, software, or a combination of the two. Reference numerals appearing in the claims are by way of illustration only and shall have no limiting effect on the scope of the claims.

The invention claimed is:

1. Method for encoding video data having a base layer and an enhancement layer, wherein the base layer has lower color resolution and lower spatial resolution than the enhancement layer, the method comprising the steps of
   upsampling base layer information, wherein the upsampling refers to spatial resolution and to bit depth being the possible value range of each pixel, and wherein a predicted version of enhancement layer information is obtained that has higher bit depth and higher spatial resolution than the base layer;
   generating an enhancement layer residual being the difference between the enhancement layer information and said predicted version of enhancement layer information; and
   encoding the base layer information, the enhancement layer residual and an indication indicating whether spatial upsampling was done before or after bit depth upsampling.

2. Method according to claim 1, wherein
   said upsampling step comprises upsampling in different ways using different prediction orders of said spatial and bit depth prediction, wherein a first and a second predicted version of enhancement layer information are obtained; and
   said step of generating comprises generating two different enhancement layer residuals based upon said first and a second predicted version of enhancement layer information;
further comprising the steps of
   comparing said two different enhancement layer residuals, wherein the smaller residual is determined;
   determining the prediction order by which the determined smaller residual is obtained; and
   encoding the smaller enhancement layer residual.

3. Method according to claim 1, further comprising the steps of
   analyzing the base layer and/or enhancement layer information according to predefined rules, wherein a value indicative of texture and/or color homogeneity is obtained;
   based on said value indicative of texture and/or color homogeneity, determining the prediction order by which the determined smaller residual is obtained; and
   encoding the enhancement layer residual according to the determined prediction order.

4. Method according to claim 1, wherein the step of upsampling comprises in the case of Intra coded base layer information texture upsampling of reconstructed base layer image data.

5. Method according to claim 1, wherein the step of upsampling comprises in the case of Inter coded base layer information upsampling of reconstructed base layer residual data.

6. Method for decoding video data having a base layer and an enhancement layer, the method comprising the steps of
   receiving enhancement layer information, base layer information and an indication;

performing inverse quantization and inverse transformation on the received base layer and enhancement layer information;

determining a prediction order based upon said indication, the prediction order indicating whether bit depth upsampling shall be done before or after spatial upsampling;

upsampling inverse quantized and inverse transformed base layer information, wherein the number of pixels and the value depth per pixel are increased in the determined prediction order and wherein predicted enhancement layer information is obtained; and reconstructing from the predicted enhancement layer information and the inverse quantized and inverse transformed enhancement layer information reconstructed enhancement layer video information.

7. Method according to claim 6, wherein the inverse quantized and inverse transformed enhancement layer information comprises residual information, further comprising the steps of reconstructing base layer video from the inverse quantized and inverse transformed base layer information and adding said residual information to said predicted version of enhancement layer information.

8. Method according to claim 6, wherein the inverse quantized and inverse transformed enhancement layer information comprises enhancement layer residual information and the inverse quantized and inverse transformed base layer information comprises base layer residual information, and wherein said step of upsampling inverse quantized and inverse transformed base layer information comprises upsampling said base layer residual information, further comprising the step of adding said enhancement layer residual information and said upsampled base layer residual information, wherein a reconstructed enhancement layer residual is obtained.

9. Apparatus for encoding video data having a base layer and an enhancement layer, wherein the base layer has lower color resolution and lower spatial resolution than the enhancement layer, comprising means for upsampling base layer information, wherein the upsampling refers to spatial resolution and to bit depth being the possible value range of each pixel, and wherein a predicted version of enhancement layer information is obtained that has higher bit depth and higher spatial resolution than the base layer;

means for generating an enhancement layer residual being the difference between the enhancement layer information and said predicted version of enhancement layer information; and means for encoding the base layer information, the enhancement layer residual and an indication indicating whether spatial upsampling was done before or after bit depth upsampling.

10. Apparatus for decoding video data having a base layer and an enhancement layer, comprising means for receiving enhancement layer information, base layer information and an indication;

means for performing inverse quantization and inverse transformation on the received base layer and enhancement layer information;

means for determining a prediction order based upon said indication, the prediction order indicating whether bit depth upsampling shall be done before or after spatial upsampling;

means for upsampling inverse quantized and inverse transformed base layer information, wherein the number of pixels and the value depth per pixel are increased in the determined prediction order and wherein predicted enhancement layer information is obtained; and means for reconstructing from the predicted enhancement layer information and the inverse quantized and inverse transformed enhancement layer information reconstructed enhancement layer video information.

\* \* \* \* \*